US012763247B2

(12) United States Patent
Yen

(10) Patent No.: US 12,763,247 B2
(45) Date of Patent: Oct. 13, 2026

(54) INDUCTOR DEVICE

(71) Applicant: Realtek Semiconductor Corporation, Hsinchu (TW)

(72) Inventor: Hsiao-Tsung Yen, Hsinchu (TW)

(73) Assignee: Realtek Semiconductor Corporation, Hsinchu (TW)

( * ) Notice: Subject to any disclaimer, the term of this patent is extended or adjusted under 35 U.S.C. 154(b) by 900 days.

(21) Appl. No.: 18/056,261

(22) Filed: Nov. 17, 2022

(65) Prior Publication Data

US 2023/0154666 A1 May 18, 2023

(30) Foreign Application Priority Data

Nov. 18, 2021 (TW) ................................ 110142939

(51) Int. Cl.
*H01F 27/28* (2006.01)
*H01F 27/30* (2006.01)

(52) U.S. Cl.
CPC ....... *H01F 27/2804* (2013.01); *H01F 27/306* (2013.01)

(58) Field of Classification Search
CPC ......... H01F 27/2804; H01F 2027/2809; H01F 17/0006; H01F 17/0013; H01F 5/003
USPC ................................................ 336/200, 232
See application file for complete search history.

(56) References Cited

U.S. PATENT DOCUMENTS

2008/0284552 A1* 11/2008 Lim .................... H01F 17/0006 336/200
2019/0237238 A1 8/2019 Yen et al.
2021/0202156 A1 7/2021 Yen et al.

FOREIGN PATENT DOCUMENTS

CN 108962563 A 12/2018

OTHER PUBLICATIONS

The office action of corresponding CN application No. 202111411620.0 issued on Feb. 25, 2026.

* cited by examiner

*Primary Examiner* — Tszfung J Chan
(74) *Attorney, Agent, or Firm* — CKC & Partners Co., LLC

(57) ABSTRACT

An inductor device includes a plurality of coils, a first central connecting portion and a plurality of side connecting portions. The coils include a first winding including a plurality of first coils and a second winding including a plurality of second coils. The first central connecting portion is configured to couple the first coils and the second coils which are interleaved, so that a first one of the second coils is coupled to a second one of the second coils. The side connecting portions are configured on two sides of the first central connecting portion and each configured to couple the second one of the second coils to a third one of the second coils, so that the second one of the second coils and a first one of the first coils compose one of the coils of the inductor device.

15 Claims, 4 Drawing Sheets

300

400

INDUCTOR DEVICE

CROSS-REFERENCE TO RELATED APPLICATION

This application claims priority to Taiwan Application Serial Number 110142939, filed Nov. 18, 2021, which is herein incorporated by reference in its entirety.

BACKGROUND

Field of Invention

This disclosure relates to an electronic device, and in particular to an inductor device.

Description of Related Art

Various types of existing inductors have their own advantages and disadvantages. For an inductor having a structure of interleaved coils, it has a large parasitic capacitance and a high inductance, which results in a low self-resonance frequency and a low quality factor. Therefore, the application range of the aforementioned inductor is limited.

SUMMARY

An aspect of present disclosure relates to an inductor device. The inductor device includes a plurality of coils, a first central connecting portion and a plurality of side connecting portions. The coils include a first winding including a plurality of first coils and a second winding including a plurality of second coils. The first central connecting portion is configured to couple the first coils and the second coils which are interleaved, so that a first one of the second coils is coupled to a second one of the second coils. The side connecting portions are configured on two sides of the first central connecting portion and each configured to couple the second one of the second coils to a third one of the second coils, so that the second one of the second coils and a first one of the first coils compose one of the coils of the inductor device, wherein the second one of the second coils is close adjacent to the third one of the second coils.

DETAILED DESCRIPTION

The embodiments are described in detail below with reference to the appended drawings to better understand the aspects of the present disclosure. However, the provided embodiments are not intended to limit the scope of the disclosure, and the description of the structural operation is not intended to limit the order in which they are performed.

Any device that has been recombined by components and produces an equivalent function is within the scope covered by the disclosure.

The terms used in the entire specification and the scope of the patent application, unless otherwise specified, generally have the ordinary meaning of each term used in the field, the content disclosed herein, and the particular content.

The terms "coupled" or "connected" as used herein may mean that two or more elements are directly in physical or electrical contact, or are indirectly in physical or electrical contact with each other. It can also mean that two or more elements interact with each other.

Figure 1:
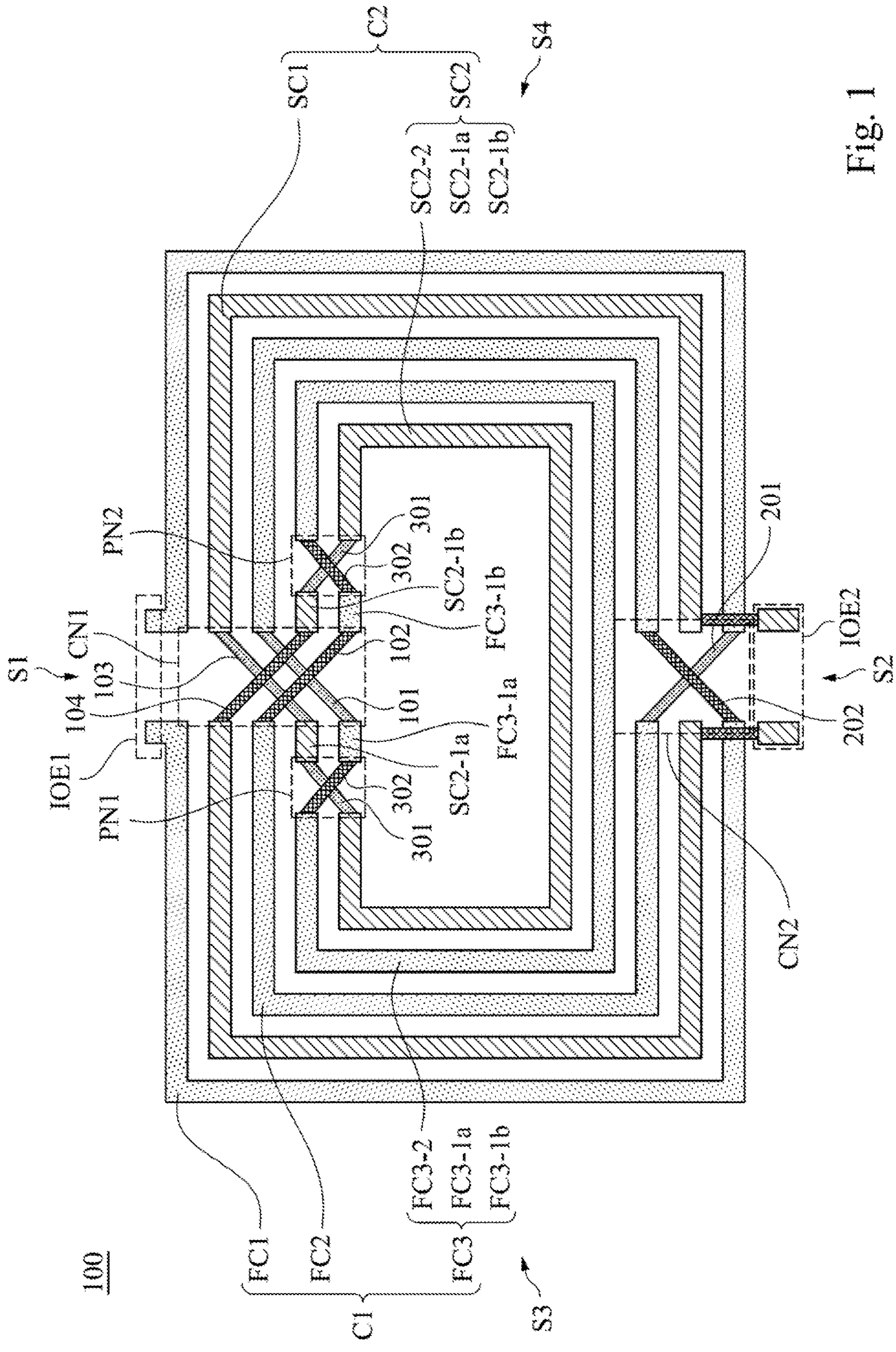
FIG. 1 is a schematic diagram of an inductor device in accordance with some embodiments of the present disclosure.

Referring to FIG. 1, FIG. 1 a schematic diagram of an inductor device 100 in accordance with some embodiments of the present disclosure. In some embodiments, the inductor device 100 includes a plurality of coils located in a same metal layer, and the coils of the inductor device 100 are composed of a first winding C1 and a second winding C2. As shown in FIG. 1, the inductor device 100 further includes a first central connecting portion CN1, a second central connecting portion CN2, a plurality of side connecting portions PN1-PN2, a first input-output terminal IOE1 and a second input-output terminal IOE2.

In the embodiment of FIG. 1, the first winding C1 is configured with a plurality of first coils FC1-FC3 (presented by areas filled with dots in FIG. 1) from outside to inside, wherein the first coil FC3 of the first winding C1 is composed of multiple first parts FC3-1*a* and FC3-1*b* and a second part FC3-2. The second winding C2 is also configured with a plurality of second coils SC1-SC2 (presented by areas filled with inclined lines in FIG. 1) from outside to inside, wherein the second coil SC2 of the second winding C2 is composed of multiple third parts SC2-1*a* and SC2-1*b* and a fourth part SC2-2. It can be appreciated that the first winding C1 and the second winding C2 are not overlapped with each other.

In some embodiments, the first input-output terminal IOE1 and the second input-output terminal IOE2 are configured to input or output signal. In particular, the first input-output terminal IOE1 is coupled to the outermost first coil FC1 on a first side S1 of the inductor device 100, and the second input-output terminal IOE2 is coupled to the outermost second coil SC1 on a second side S2 of the inductor device 100. As shown in FIG. 1, the first side S1 (e.g., an upper side) and the second side S2 (e.g., a lower side) are two opposite sides.

In some embodiments, the first central connecting portion CN1 is located on the first side S1 of the inductor device 100, and the second central connecting portion CN2 is located on the second side S2 of the inductor device 100. The side connecting portions PN1-PN2 are arranged on two sides of the first central connecting portion CN1 respectively. For example, the side connecting portion PN1 is arranged on a left side of the first central connecting portion CN1, and the side connecting portion PN2 is arranged on a right side of the first central connecting portion CN1. The structures of the first central connecting portion CN1, the second central connecting portion CN2 and the side connecting portions PN1-PN2 would be described below respectively.

In some embodiments, the first central connecting portion CN1 is configured to couple the first coils FC2-FC3 and the second coils SC1-SC2 which are interleaved, and the first central connecting portion CN1 includes a first crossing portion and a second crossing portion. As shown in FIG. 1, the first crossing portion and the second crossing portion are incompletely overlapped. The first crossing portion includes multiple connecting members 101 and 102 and is configured to couple the first coil FC2 (i.e., the middle first coil) and the first coil FC3 (i.e., the innermost first coil). The second crossing portion includes multiple connecting members 103 and 104 and is configured to couple the second coil SC1 (i.e., the outermost second coil) and the second coil SC2 (i.e., the innermost second coil). In particular, the connecting member 101 is located in a first metal layer. The connecting member 102 is located in a second metal layer and is intersected with the connecting member 101. The connecting member 103 is located in the first metal layer, is not overlapped with the connecting member 101 and is intersected with the connecting member 102. The connecting member 104 is located in the second metal layer, is not overlapped with the connecting member 102 and is intersected with the connecting members 101 and 103.

In some embodiments, the side connecting members PN1-PN2 each are configured to couple the first coil and the second coil adjacent to each other (e.g., the innermost first coil FC3 and the innermost second coil SC2). As shown in FIG. 1, the side connecting members PN1-PN2 each include multiple connecting members 301-302. In particular, the connecting member 301 is located in the first metal layer. The connecting member 302 is located in the second metal layer and is intersected with the connecting member 301.

In some embodiments, the second central connecting portion CN2 includes a third crossing portion. As shown in FIG. 1, the third crossing portion includes multiple connecting members 201-202 and is configured to couple the outermost first coil FC1 and the middle first coil FC2. In particular, the connecting member 201 is located in the first metal layer. The connecting member 202 is located in the second metal layer and is intersected with the connecting member 201.

In the embodiment of FIG. 1, the first coils FC1-FC3 and the second coils SC1-SC2 are also located in the first metal layer, but the present disclosure is not limited thereto. In some embodiments, the first coils FC1-FC3 and the second coils SC1-SC2 are located in the second metal layer.

In some embodiments, the first metal layer is different from the second metal layer. For example, the first metal layer is an ultra-thick metal (UTM) layer, and the second metal layer is aluminum redistribution layer (AL-RDL). It can be appreciated that the present disclosure is not limited herein.

Referring to FIG. 1 again, the structure of the first winding C1 is described first. in detail, a left half-coil of the first coil FC1 is coupled to the first input-output terminal IOE1 on the first side S1, is wound counterclockwise from the first side S1 to the second side S2 and is coupled to a terminal of the connecting member 202 through a via on the second side S2. Another terminal of the connecting member 202 is also coupled to a right half-coil of the first coil FC2 through a via.

The right half-coil of the first coil FC2 is wound counterclockwise from the second side S2 to the first side S1 and is directly coupled to a terminal of the connecting member 101. Another terminal of the connecting member 101 is also directly coupled to a terminal of the first part FC3-1*a* of the first coil FC3. Another terminal of the first part FC3-1*a* of the first coil FC3 is coupled to a terminal of the connecting member 302 of the side connecting portion PN1 through a via, and another terminal of the connecting member 302 of the side connecting portion PN1 is also coupled to the second part FC3-2 of the first coil FC3 through a via. In other words, a first one of the first coils (e.g., the right half-coil of the first coil FC2) is coupled to a second one of the first coils (e.g., the first part FC3-1*a* of the first coil FC3) through the first central connecting portion CN1, and the second one of the first coils is coupled to a third one of the first coils (e.g., the second part FC3-2 of the first coil FC3) through the side connecting portion PN1.

The second part FC3-2 of the first coil FC3 is wound counterclockwise from a left side of the side connecting portion PN1 to a right side of the side connecting portion PN2 and is coupled to a terminal of the connecting member 302 of the side connecting portion PN2 through a via. Another terminal of the connecting member 302 of the side connecting portion PN2 is also coupled to a terminal of the first part FC3-1*b* of the first coil FC3 through a via. Another terminal of the first part FC3-1*b* of the first coil FC3 is coupled to a terminal of the connecting member 102 through a via, and another terminal of the connecting member 102 is coupled to a left half-coil of the first coil FC2 through a via. In other words, a first one of the first coils (e.g., the left half-coil of the first coil FC2) is coupled to a second one of the first coils (e.g., the first part FC3-1*b* of the first coil FC3) through the first central connecting portion CN1, and the second one of the first coils is coupled to a third one of the first coils (e.g., the second part FC3-2 of the first coil FC3) through the side connecting portion PN2.

The left half-coil of the first coil FC2 is wound counterclockwise from the first side S1 to the second side S2 and is directly coupled to a terminal of the connecting member 201 on the second side S2. Another terminal of the connecting member 201 is also directly coupled to a right half-coil of the first coil FC1. Finally, the right half-coil of the first coil FC1 is wound counterclockwise from the second side S2 to the first side S1 and is coupled to the first input-output terminal IOE1 on the first side S1.

It can be seen from the above descriptions that the second one of the first coils (e.g., the first part FC3-1*a* or FC3-1*b* of the first coil FC3) is close adjacent to the third one of the first coils (e.g., the second part FC3-2 of the first coil FC3) by the configuration of the side connecting portions PN1 and PN2.

The structure of the second winding C2 is then described. In detail, a right half-coil of the second coil SC1 is coupled to the second input-output terminal IOE2 on the second side S2 through a connecting member crossed over the right half-coil of the first coil FC1, is wound counterclockwise from the second side S2 to the first side S1 and is directly coupled to a terminal of the connecting member 103 on the first side S1. Another terminal of the connecting member 103 is also directly coupled to a terminal of the third part SC2-1*a* of the second coil SC2. Another terminal of the third part SC2-1*a* of the second coil SC2 is directly coupled to a terminal of the connecting member 301 of the side connecting portion PN1. Another terminal of the connecting member 301 of the side connecting portion PN1 is directly coupled to the fourth part SC2-2 of the second coil SC2. In other words, a first one of the second coils (e.g., the right half-coil of the second coil SC1) is coupled to a second one of the second coils (e.g., the third part SC2-1*a* of the second coil SC2) through the first central connecting portion CN1, and the second one of the second coils is coupled to a third one of the second coils (e.g., the fourth part SC2-2 of the second coil SC2) through the side connecting portion PN1.

The fourth part SC2-2 of the second coil SC2 is wound counterclockwise from the left side of the side connecting portion PN1 to the right side of the side connecting portion PN2 and is directly coupled to a terminal of the connecting member 301 of the side connecting portion PN2. Another terminal of the connecting member 301 of the side connecting portion PN2 is also directly coupled to a terminal of the third part SC2-1*b* of the second coil SC2. Another terminal of the third part SC2-1*b* of the second coil SC2 is coupled to a terminal of the connecting member 104 through a via, and another terminal of the connecting member 104 is also coupled to a left half-coil of the second coil SC1 through a via. In other words, a first one of the second coils (e.g., the left half-coil of the second coil SC1) is coupled to a second one of the second coils (e.g., the third part SC2-1*b* of the second coil SC2) through the first central connecting portion CN1, and the second one of the second coils is coupled to a third one of the second coils (e.g., the fourth part SC2-2 of the second coil SC2) through the side connecting portion PN2.

Finally, the left half-coil of the second coil SC1 is wound counterclockwise from the first side S1 to the second side S2 and is coupled to the second input-output terminal IOE2 through another connecting member crossed over the left half-coil of the first coil FC1.

It can be seen from the above descriptions that the second one of the second coils (e.g., the third part SC2-1*a* or SC2-1*b* of the second coil SC2) is close adjacent to the third one of the second coils (e.g., the fourth part SC2-2 of the second coil SC2) by the configuration of the side connecting portions PN1 and PN2.

It can be further seen from the above descriptions that the first coils of the first winding C1 and the second coils of the second winding C2 are distributed at different positions of a same metal layer via the configuration of the first central connecting portion CN1, the second central connecting portion CN2 and the side connecting portions PN1-PN2 to form multiple turns of the inductor device 100. As shown in FIG. 1, the inductor device 100 is configured with a first turn, a second turn, a third turn, a fourth turn and a fifth turn from outside to inside.

In particular, the turns of the inductor device 100 which are provided with the side connecting portions PN1-PN2 are composed of the first coil and the second coil. For example, the fourth turn of the inductor device 100 is composed of the second part FC3-2 of the first coil FC3 and the two third parts SC2-1*a* and SC2-1*b* of the second coil SC2. The fifth turn of the inductor device 100 is composed of the two first parts FC3-1*a* and FC3-1*b* of the first coil FC3 and the fourth parts SC2-2 of the second coil SC2. In other words, one of the coils of the inductor device 100 is composed of one of the first coils coupled to one side of the side connecting portion PN1 (or PN2) (e.g., the first part FC3-1*a* or the second part FC3-2) and one of the second coils coupled to the other side of the side connecting portion PN1 (or PN2) (e.g., the fourth part SC2-2 or the third part SC2-1*a*).

In addition, the turns of the inductor device 100 which are not provided with the side connecting portions PN1-PN2 are composed of the first coil or the second coil alone. For example, the first turn of the inductor device 100 is composed of the first coil FC1 of the first winding C1 only. The second turn of the inductor device 100 is composed of the second coil SC1 of the second winding C2 only. The third turn of the inductor device 100 is composed of the first coil FC2 of the first winding C1 only.

It can be further seen from the above descriptions that the first coils FC2-FC3 and the second coils SC1-SC2 which are coupled to two sides of the first central connecting portion CN1 are arranged symmetrically. For example, the left half-coil of the first coil FC1, the left half-coil of the second coil SC1, the left half-coil of the first coil FC2, the left third part SC2-1*a* of the second coil SC2 and the left first part FC3-1*a* of the first coil FC3 are sequentially arranged on the left side of the first central connecting portion CN1 from outside to inside. The right half-coil of the first coil FC1, the right half-coil of the second coil SC1, the right half-coil of the first coil FC2, the right third part SC2-1*b* of the second coil SC2 and the right first part FC3-1*b* of the first coil FC3 are sequentially arranged on the right side of the first central connecting portion CN1 from outside to inside.

In addition, the first coils and the second coils on two sides of the side connecting portion PN1 are arranged asymmetrically. For example, the first coil FC2, the second part FC3-2 of the first coil FC3 and the fourth part SC2-2 of the second coil SC2 are sequentially arranged on the left side of the side connecting portion PN1 from outside to inside (that is, the second part FC3-2 is arranged between the middle first coil FC2 and the fourth part SC2-2). However, the first coil FC2, the left third part SC2-1*a* of the second coil SC2 and the left first part FC3-1*a* of the first coil FC3 are sequentially arranged on the right side of the side connecting portion PN1 from outside to inside (that is, the third part SC2-1*a* is arranged between the middle first coil FC2 and the first part FC3-1*a*). It can be appreciated that the first coils and the second coils coupled to two sides of the side connecting portion PN2 are also arranged asymmetrically, and the descriptions thereof are omitted herein.

Notably, by the configuration of the left side connecting portion PN1, the left half-coil of the first coil FC2 is adjacent to the second part FC3-2 of the first coil FC3 (that is, the second coil is not provided between the left half-coil of the first coil FC2 and the second part FC3-2 of the first coil FC3), and is not adjacent to the fourth part SC2-2 of the second coil SC2. For the same reason, by the configuration of the right side connecting portion PN2, the right half-coil of the first coil FC2 is adjacent to the second part FC3-2 of the first coil FC3 (that is, the second coil is not provided between the right half-coil of the first coil FC2 and the second part FC3-2 of the first coil FC3), and is not adjacent to the fourth part SC2-2 of the second coil SC2. In such way, the equivalent inductance value and the quality factor of the inductor device 100 can be increased dramatically, and the equivalent parasitic capacitance value of the inductor device 100 can be reduced dramatically.

Figure 2:
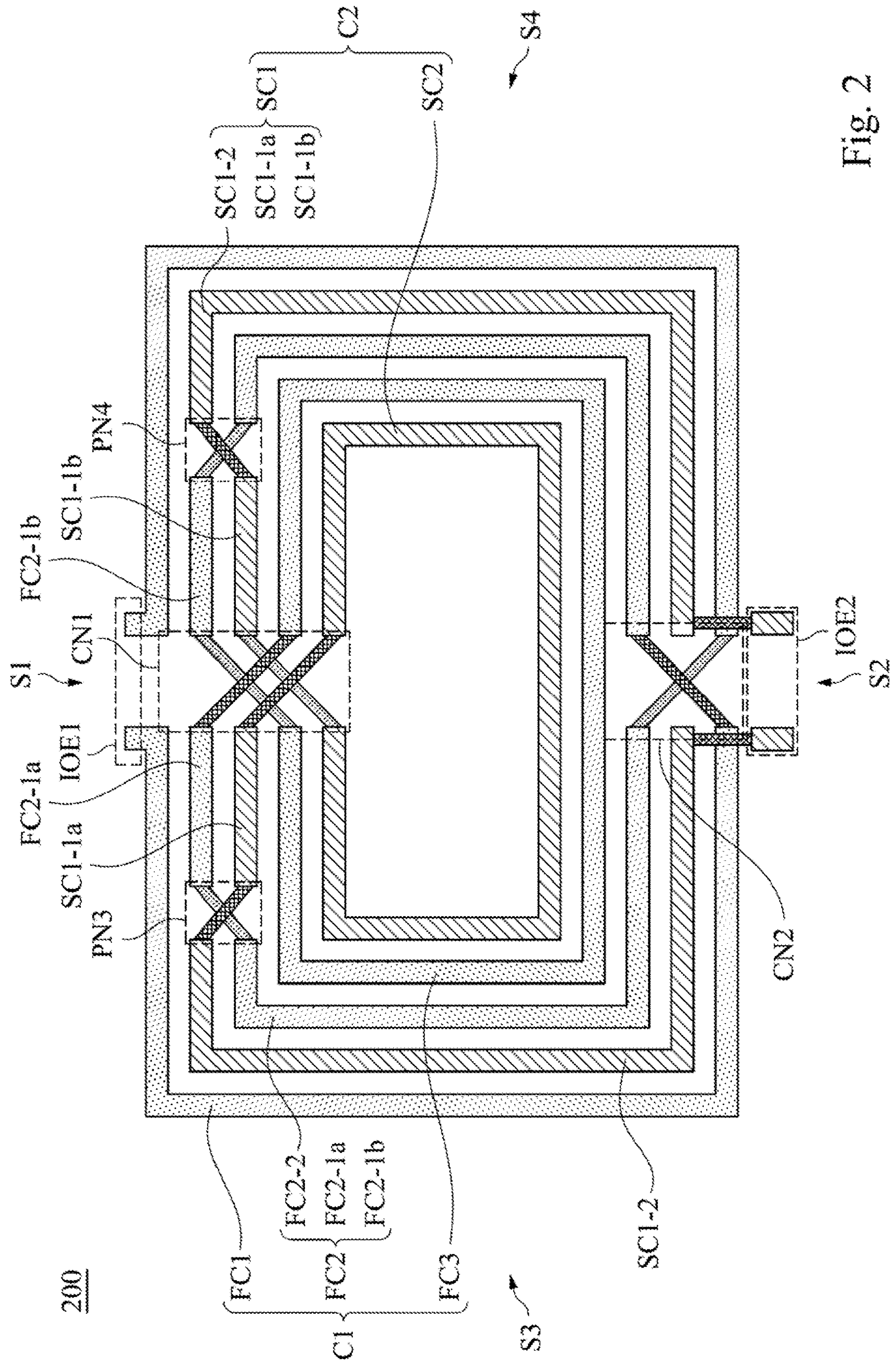
FIG. 2 is a schematic diagram of an inductor device in accordance with some embodiments of the present disclosure.

Referring to FIG. 2, FIG. 2 is a schematic diagram of an inductor device 200 in accordance with some embodiments of the present disclosure. The symbols in FIG. 2 which are same as those in FIG. 1 represent same or similar components, and therefore the descriptions thereof are omitted herein. In the embodiment of FIG. 2, each of the side connecting portions PN3-PN4 of the inductor device 200 is coupled to the middle first coil FC2 and the outermost second coil SC2. Also, the middle first coil FC2 is composed of multiple first parts FC2-1*a* and FC2-1*b* and a second part FC2-2, and the outermost second coil SC1 is composed of multiple third parts SC1-1*a* and SC1-1*b* and a fourth part SC1-2. The second turn of the inductor device 200 is composed of the two first parts FC2-1*a* and FC2-1*b* of the first coil FC2 and the fourth part SC1-2 of the second coil SC1. The third turn of the inductor device 200 is composed of the second part FC2-2 of the first coil FC2 and the two third parts SC1-1*a* and SC1-1*b* of the second coil SC1. It can be appreciated that the side connecting portion PN3 or PN4 can be implemented by the side connecting portion PN1 or PN2 of FIG. 1, and therefore the descriptions of its structure are omitted herein.

In the embodiment of FIG. 2, a first one of the first coils (e.g., the first coil FC3) is coupled to a second one of the first coils (e.g., the first part FC2-1*a* or FC2-1*b* of the first coil FC2) through the first central connecting portion CN1, and the second one of the first coils is coupled to a third one of the first coils (e.g., the left or right second part FC2-2 of the first coil FC2) through the side connecting portion PN3 or PN4. Similarly, a first one of the second coils (e.g., the second coil SC2) is coupled to a second one of the second coils (e.g., the third part SC1-1*a* or SC1-1*b* of the second coil SC1) through the first central connecting portion CN1, and the second one of the second coils is coupled to a third one of the second coils (e.g., the left or right fourth part SC1-2 of the second coil SC1) through the side connecting portion PN3 or PN4.

In addition, the second one of the first coils (e.g., the first part FC2-1*a* or FC2-1*b* of the first coil FC2) is close adjacent to the third one of the first coils (e.g., the left or right second part FC2-2 of the first coil FC2) by the configuration of the side connecting portions PN3 and PN4. For the same reason, the second one of the second coils (e.g., the third part SC1-1*a* or SC1-1*b* of the second coil SC1) is close adjacent to the third one of the second coils (e.g., the left or right fourth part SC1-2 of the second coil SC1).

As shown in FIG. 2 again, by the configuration of the left side connecting portion PN3, the first coil FC3 is adjacent to the left second part FC2-2 of the first coil FC2 and is not adjacent to the left fourth part SC1-2 of the second coil SC1. For the same reason, by the configuration of the right side connecting portion PN4, the first coil FC3 is adjacent to the right second part FC2-2 of the first coil FC2 and is not adjacent to the right fourth part SC1-2 of the second coil SC1. In such way, the equivalent inductance value and the quality factor of the inductor device 200 can be increased dramatically, and the equivalent parasitic capacitance value of the inductor device 200 can be reduced dramatically.

In above embodiments, the inductor device (e.g., the inductor device 100 of FIG. 1, the inductor device 200 of FIG. 2) has a square structure (i.e., a quadrilateral structure). It can be appreciated that the inductor device can also be other polygonal structure in other embodiments. In addition, it can be appreciated that the number of the coils of the inductor device is only for illustrated purpose, and the present disclosure is not limited to the number as shown in FIGS. 1 and 2 (e.g., 5 turns). The descriptions would be made below by taking the embodiment of FIG. 3 as example.

Figure 3:
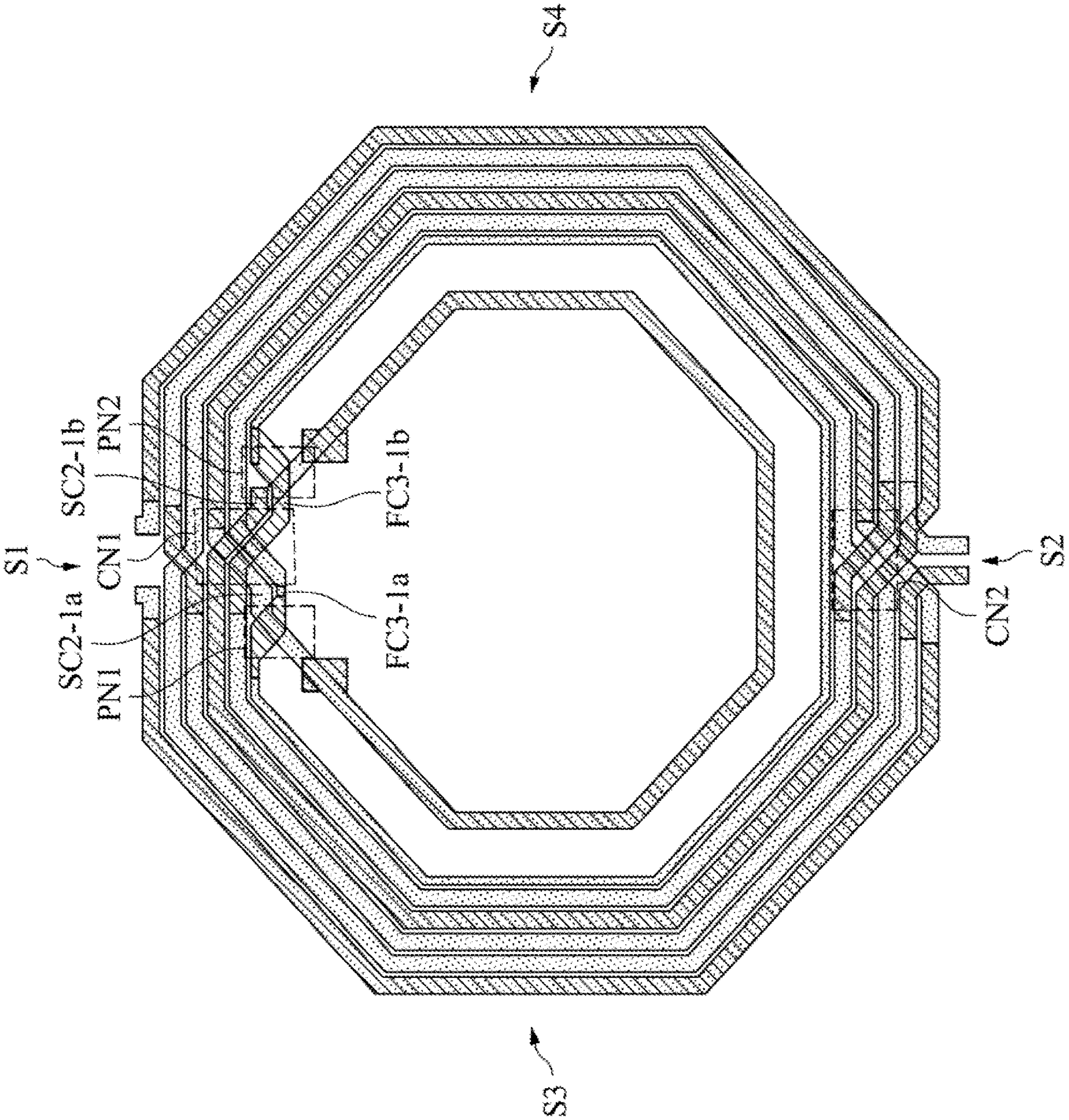
FIG. 3 is a schematic diagram of an inductor device in accordance with some embodiments of the present disclosure.

Referring to FIG. 3, FIG. 3 is a schematic diagram of an inductor device 300 in accordance with some embodiments of the present disclosure. In particular, the inductor device 300 has an octagonal structure and has at least 7 coils. The symbols in FIG. 3 which are same as those in FIG. 1 represent same or similar components, and therefore the descriptions thereof are omitted herein.

In above embodiments, the side connecting portions (e.g., PN1-PN2 in FIG. 1 or 3 and PN3-PN4 in FIG. 2) and the first central connecting portion CN1 are all on the first side S1 of the inductor device, but the present disclosure is not limited herein. In other embodiments, the side connecting portions are on the second side S2 of the inductor device 100, or are on a third side S3 and a fourth side S4 of the inductor device 100, respectively. In particular, the third side S3 (e.g., a left side) and the fourth side S4 (e.g., a right side) are two opposite sides. The descriptions would be made below by taking the embodiment of FIG. 4 as example.

Figure 4:
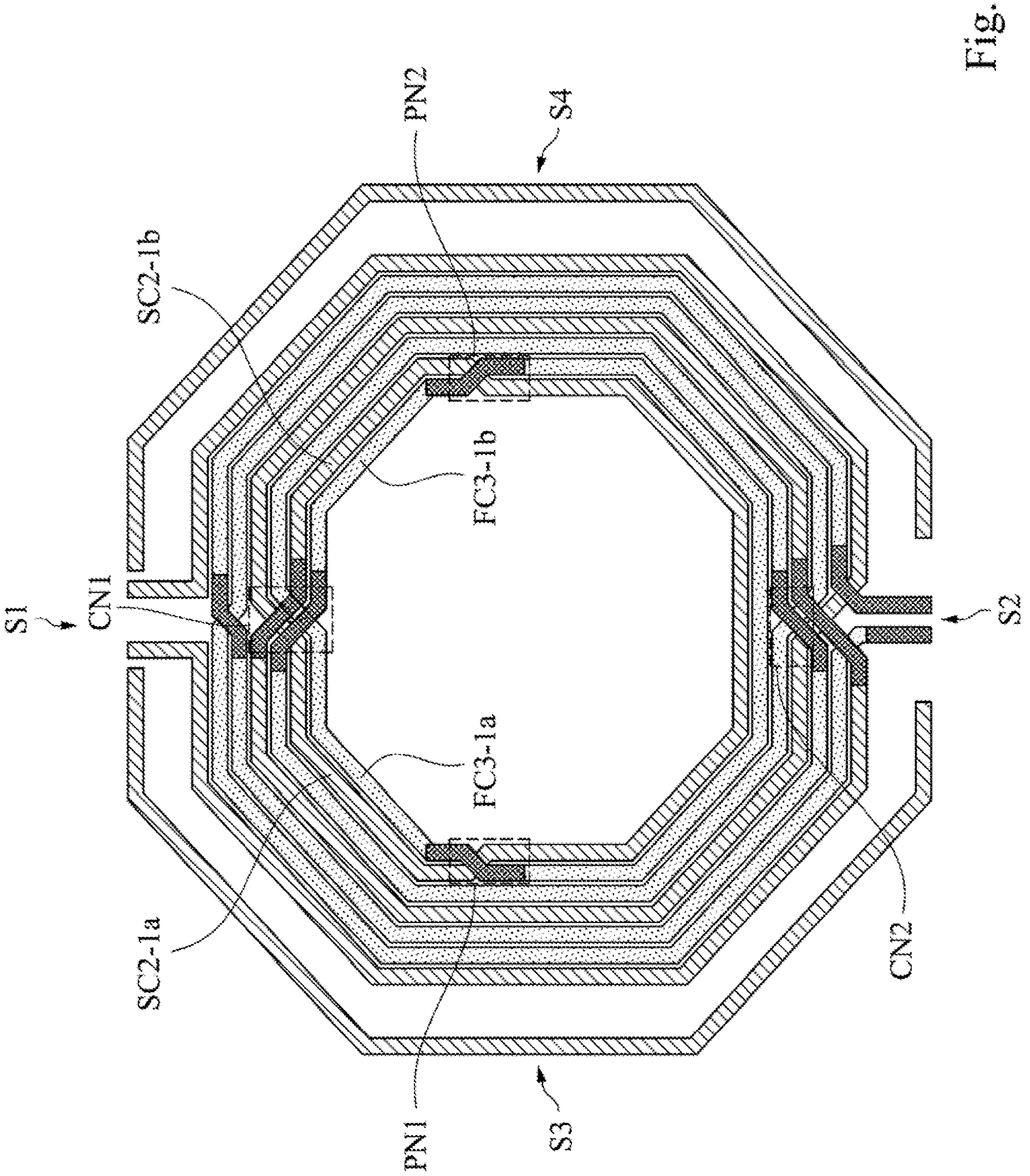
FIG. 4 is a schematic diagram of an inductor device in accordance with some embodiments of the present disclosure.

Referring to FIG. 4, FIG. 4 is a schematic diagram of an inductor device 400 in accordance with some embodiments of the present disclosure. In particular, multiple connecting portions PN1-PN2 are on the third side S3 and the fourth side S4 of the inductor device 400, respectively. The symbols in FIG. 4 which are same as those in FIG. 1 represent same or similar components, and therefore the descriptions thereof are omitted herein.

It can be seen from the above embodiments of the present disclosure that the inductor device of the present disclosure has the advantage of reduced equivalent parasitic capacitance value by the side connecting portions configured on two sides of the first central connecting portion. In addition, the inductor device can further increase the equivalent inductance value and the quality factor by the structure of the present disclosure.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the invention. In view of the foregoing, it is intended that the present invention cover modifications and variations of this invention provided they fall within the scope of the following claims.

What is claimed is:

1. An inductor device, comprising:

a plurality of coils comprising:

a first winding comprising a plurality of first coils; and a second winding comprising a plurality of second coils;

a first central connecting portion configured to couple the plurality of first coils and the plurality of second coils which are interleaved, so that a first one of the plurality of second coils is coupled to a second one of the plurality of second coils; and a plurality of side connecting portions configured on two sides of the first central connecting portion and each configured to couple the second one of the plurality of second coils to a third one of the plurality of second coils, so that the second one of the plurality of second coils and a first one of the plurality of first coils compose one of the plurality of coils of the inductor device;

wherein the second one of the plurality of second coils is close adjacent to the third one of the plurality of second coils, wherein the plurality of first coils comprises a middle first coil, the plurality of second coils comprises an outermost second coil, and the plurality of side connecting portions each are further configured to couple the middle first coil and to couple the outermost second coil, wherein the plurality of side connecting portions each comprises:

a first connecting member configured to couple a first part and a second part of the middle first coil; and a second connecting member configured to couple a third part and a fourth part of the outermost second coil, wherein the first connecting member and the second connecting member are intersected with each other, and the first connecting member and the second connecting member are in different layers.

2. The inductor device of claim 1, wherein the plurality of first coils further comprises an outermost first coil, the first part is arranged between the outermost first coil and the third part, and the fourth part is arranged between the outermost first coil and the second part.

3. The inductor device of claim 1, wherein the plurality of first coils comprises an outermost first coil, the middle first coil and an innermost first coil, the plurality of second coils comprises the outermost second coil and an innermost second coil, and the first central connecting portion comprises:

a first crossing portion configured to couple the innermost first coil and the middle first coil; and a second crossing portion configured to couple the outermost second coil and the innermost second coil, wherein the first crossing portion and the second crossing portion are incompletely overlapped with each other.

4. The inductor device of claim 3, wherein the first crossing portion comprises a third connecting member, and the third connecting member is configured to couple the innermost first coil and the middle first coil.

5. The inductor device of claim 4, wherein the first crossing portion further comprises a fourth connecting member, and the fourth connecting member is configured to couple the innermost first coil and the middle first coil, wherein the third connecting member and the fourth connecting member are intersected with each other, and the third connecting member and the fourth connecting member are in different layers.

6. The inductor device of claim 5, wherein the second crossing portion comprises a fifth connecting member, and the fifth connecting member is configured to couple the outermost second coil and the innermost second coil, wherein the fifth connecting member is intersected with the fourth connecting member, is not overlapped with the third connecting member and is in same layer with the third connecting member.

7. The inductor device of claim 6, wherein the second crossing portion further comprises a sixth connecting member, and the sixth connecting member is configured to couple the outermost second coil and the innermost second coil, wherein the sixth connecting member is intersected with the third connecting member and the fifth connecting member, is not overlapped with the fourth connecting member and is in same layer with the fourth connecting member.

8. The inductor device of claim 3, wherein the inductor device further comprises a second central connecting portion, the first central connecting portion is on a first side of the inductor device, and the second central connecting portion is on a second side of the inductor device, wherein the first side is different from the second side.

9. The inductor device of claim 8, wherein the second central connecting portion comprises a third crossing portion, and the third crossing portion is configured to couple the outermost first coil and the middle first coil.

10. The inductor device of claim 9, wherein the third crossing portion comprises a third connecting member, and the third connecting member is configured to couple the outermost first coil and the middle first coil.

11. The inductor device of claim 10, wherein the third crossing portion further comprises a fourth connecting member, and the fourth connecting member is configured to couple the outermost first coil and the middle first coil, wherein the third connecting member and the fourth connecting member are intersected with each other, and the third connecting member and the fourth connecting member are in different layers.

12. The inductor device of claim 8, wherein the plurality of side connecting portions are on the first side of the inductor device.

13. The inductor device of claim 8, wherein the plurality of side connecting portions are on a third side and a fourth side of the inductor device respectively, wherein the third side is different from the first side and the second side, the fourth side is different from the first side and the second side, and the third side is different from the fourth side.

14. The inductor device of claim 8, wherein the plurality of side connecting portions are on the second side of the inductor device.

15. The inductor device of claim 8, wherein the inductor device further comprises a first input-output terminal and a second input-output terminal, the first input-output terminal is coupled to the outermost first coil on the first side of the inductor device, and the second input-output terminal is coupled to the outermost second coil on the second side of the inductor device.

* * * * *